(12) United States Patent
Skowronski et al.

(10) Patent No.: US 7,640,746 B2
(45) Date of Patent: *Jan. 5, 2010

(54) METHOD AND SYSTEM INTEGRATING SOLAR HEAT INTO A REGENERATIVE RANKINE STEAM CYCLE

(75) Inventors: Mark Joseph Skowronski, San Clemente, CA (US); Ronald Farris Kincaid, Los Alamitos, CA (US)

(73) Assignee: Markon Technologies, LLC, Los Alamitos, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/440,493

(22) Filed: May 25, 2006

(65) Prior Publication Data

US 2006/0266039 A1 Nov. 30, 2006

Related U.S. Application Data

(60) Provisional application No. 60/684,845, filed on May 27, 2005.

(51) Int. Cl.
*B60K 16/00* (2006.01)
(52) U.S. Cl. .......................... 60/641.8; 60/653; 60/677; 60/679
(58) Field of Classification Search ................ 60/641.8, 60/643, 677–680, 653
See application file for complete search history.

(56) References Cited

U.S. PATENT DOCUMENTS

| | | | |
|---|---|---|---|
| 3,995,429 A | 12/1976 | Peters | |
| 4,069,674 A | 1/1978 | Warren | |
| 4,164,123 A * | 8/1979 | Smith | 60/641.11 |
| 4,192,144 A | 3/1980 | Pierce | |
| 4,613,409 A | 9/1986 | Volland | |
| 5,444,972 A | 8/1995 | Moore | |
| 5,727,379 A | 3/1998 | Cohn | |
| 5,806,317 A | 9/1998 | Kohler et al. | |
| 5,857,322 A | 1/1999 | Cohn | |
| 6,694,740 B2 | 2/2004 | Nayar | |
| 6,792,759 B2 | 9/2004 | Rollins | |

OTHER PUBLICATIONS

12th Solar PACES International Symposium, Mexico 2004 Plug-In Strategy for Market Introduction of Fresnel Collectors, Lurchenmuller et al.
"Stanwell Solar Thermal Power Project" by Burbidge, et al.

* cited by examiner

*Primary Examiner*—Hoang M Nguyen
(74) *Attorney, Agent, or Firm*—Knobbe Martens Olson & Bear, LLP

(57) ABSTRACT

A method to integrate collected solar thermal energy into the feedwater system of a Rankine cycle power plant is disclosed. This novelty uses a closed loop, single phase fluid system to collect both the solar heat and to provide the heat input into the feedwater stream of a regenerative Rankine cycle. One embodiment of this method of integrating solar energy into a regenerative Rankine power plant cycle, such as a coal power plant, allows for automatic balancing of the steam extraction flows and does not change the temperature of the feedwater to the boiler. The concept, depending on the application, allows for the spare turbine capacity normally available in a coal plant to be used to produce incremental capacity and energy that is powered by solar thermal energy. By "piggybacking" on the available components and infrastructure of the host Rankine cycle power plant, considerable cost savings are achieved resulting in lower solar produced electricity costs.

13 Claims, 2 Drawing Sheets

**Method to Integrate Solar Heat into a Regenerative Rankine Steam Cycle
(With Auto Adjust Extraction Steam)**

METHOD AND SYSTEM INTEGRATING SOLAR HEAT INTO A REGENERATIVE RANKINE STEAM CYCLE

CROSS-REFERENCE TO RELATED APPLICATIONS

This application claims the benefits of the U.S. Provisional Patent Application No. 60/684,845 entitled "Method To Integrate Solar Thermal With A Coal Fired Rankine Cycle" filed on May 27, 2005. This provisional application is incorporated by reference herein in its entirety.

REFERENCES CITED

U.S. Patent Documents

| | |
|---|---|
| 3,995,429 | Rollins |
| 4,069,674 | Warren |
| 4,192,144 | Pierce |
| 4,613,409 | Volland |
| 5,444,972 | Moore |
| 5,727,379 | Cohn |
| 5,806,317 | Kohler, et al |
| 5,857,322 | Cohn |
| 6,792,759 | Rollins |
| 6,694,740 | Nayar |

TECHNICAL PAPERS AND PUBLICATIONS $12^{th}$ SolarPACES Intern. Symposium, Mexico 2004 "Plug-In Strategy for Market Introduction of Fresnel Collectors", Lurchenmuller et al "Stanwell Solar Thermal Power Project" by Burbidge, et al

FIELD OF THE INVENTION

This invention pertains to the electric power generation field wherein large utility size power plants are used to generate the nation's electricity. The ever increasing cost of fossil fuels will not abate since fossil fuels have a finite limit and, as the finite quantity decreases with use, the growing demand for electricity will ultimately lead to significantly higher electricity costs. This invention utilizes the sun to provide supplemental heat into a conventional Rankine cycle. A major advantage of this novelty is that it "piggybacks" on the existing components and infrastructure of the new or existing Rankine cycle power plant. This piggybacking results in significant cost reduction since a solar boiler, solar feedwater train and solar steam turbine-generator are not needed; these components are supplied in the Rankine cycle instead and convert the solar supplied heat into electricity resulting in a significant reduction in the cost of solar produced electricity.

In addition, the novelty is particularly well suited to supply supplemental solar heat to a coal regenerative Rankine cycle since this type of coal plant often has surplus capacity in its steam turbine generator and associated equipment. This surplus capacity is normally installed since the valving out of a feedwater heater for maintenance or unexpected outage will result in a higher capacity steam flow through the steam turbine and the operators of the plant would then have the extra turbine capacity to handle the excess steam flow. By having this surplus capacity, the Rankine cycle can then produce greater amounts of generation. However, there is a detrimental impact on the heat rate (efficiency) when a feedwater heater is valved out. The novelty proposed herein supplements the heat input into the Rankine cycle such that this inefficiency is essentially eliminated. The type of novelty proposed herein is best suited for large scale Rankine cycle power plants that utilize regenerative feedwater stream and are typically in the 100 MW and greater size range.

BACKGROUND OF THE INVENTION

The concept of integrating a solar thermal power plant into a fossil fuel power plant has previously been investigated; in these investigations, solar heat was used to preheat feedwater through evaporation of the feedwater or the feedwater is bifurcated resulting in a portion of the feedwater stream to be heated with extraction steam and the remaining feedwater stream heated by solar means. For example, Cohn U.S. Pat. No. 5,727,379 teaches that solar heat is used to evaporate the feedwater prior to boiler entrance. This method would then require an expensive solar boiler and is not applicable to a Rankine cycle using regenerative heating. Warren U.S. Pat. No. 4,069,674 teaches that the feedwater is bifurcated immediately at the condenser hotwell resulting in high temperature solar being used to heat relatively cold feedwater resulting in high entropic losses. Thermodynamically, it is always preferable to add heat at the highest possible temperature. In addition, current technology being explored uses solar heat to evaporate water into steam which is then used to directly provide energy to a feedwater heater. This type of technology results in complex and costly equipment when compared to the novelty proposed.

While all of these methods provide some sort of value addition, they all have certain thermodynamic restrictions and cost disadvantages. The following concept proposes a novelty that is more cost effective and energy efficient than any of the previously studied integration methods and poses less capital and less operational risk to the host regenerative steam cycle power plant. The concept can be used for new installations or can be easily retrofitted into existing regenerative Rankine power cycles such as coal plants. In particular, the southwest United States has numerous coal plants that are located in isolated areas that have high solar insolation that are prime candidates for solar thermal retrofit. This method may also be used for other fossil fueled (including natural gas) or nuclear fueled boiler scenarios and most other regenerative steam Rankine power cycles.

For purposes of illustration, this novelty is discussed herein as applied to a coal plant. Nearly all large coal plants use both reheat and regeneration to achieve high cycle efficiency. Reheat can be defined as returning steam, which has been partially expanded in the turbine, back to the boiler for additional heating prior to continued expansion in the turbine. Regeneration is a method to limit condenser loss in a Rankine cycle by taking partially expanded steam (extracted from the steam turbine) and using it to pre-heat the feedwater prior to additional heating and vaporization in the boiler. By pre-heating the feedwater, less heat energy is needed in the boiler to produce steam and, since the partially expanded steam is condensed using feedwater as the "heat sink", less heat is rejected to the condenser. Regeneration can be accomplished using either "open" or "closed" feedwater heaters. In the "open" feedwater heater, the extracted steam from the turbine is mixed directly with the feedwater; in the "closed" feedwater heater, the extraction steam is not mixed with the feedwater but uses both sensible and latent heat in normally a tube and shell feedwater heater to boost the feedwater temperature.

This novelty achieves lower solar power electricity costs by utilizing the existing power plant components and infrastructure, primarily the turbine and generator of the Rankine cycle power plant. A solar boiler is also not necessary since all solar heat is directly transferred to the Rankine cycle via a common fluid that is used for both solar heat collection and heating the feedwater stream in the Rankine cycle.

SUMMARY OF TH INVENTION

The proposed concept uses a "closed" feedwater heater system to heat the feedwater directly with collected solar thermal energy and without the additional steam conversion process typically found in other studied solar Rankine integration methods. A common single phase heat transfer fluid is used in a sensible heat transfer process to both collect the solar heat energy and to add heat into the feedwater stream of the coal plant thus supplanting a portion of the turbine extraction steam used to pre-heat the feedwater. The additional feedwater heater which is heated with solar energy is added either serially or in parallel to the conventional feedwater heaters that use extraction steam to heat the feedwater. In this manner, the extracted steam from the turbine is reduced but the boiler still receives the feedwater at the same temperature as before. Accordingly, the amount of turbine output is increased because more steam is now directed through the turbine and the overall efficiency remains high because there is no degradation in the feedwater temperature. Typically, there are sufficient margins in the turbine generator of a coal regenerative steam cycle to allow an increase in capacity output resulting from an increase in steam flow through the turbine; typically these margins are in the order of 5% to 10% of additional generating capacity which would then be available to provide the additional generation when the Rankine cycle is augmented with solar heat. This increase in steam turbine flow would result from the reduction in extraction steam flows since solar heat is now replacing a portion of the extracted steam used for feedwater heating. Consequently, the direct heating of the feedwater through solar thermal energy will allow an increase in turbine output in new facilities where the extra steam turbine capacity is designed into the plant or at existing facilities where there are additional margins in the steam turbine. In existing facilities where there is no spare capacity in the steam turbine, the solar heat will still displace fossil fuel.

The proposed novelty can be used to input solar heat in an added feedwater heater that is located downstream of the last feedwater heater (in a retrofit application) and have the potential, if so desired by the coal plant operators, to increase the feedwater temperature to the boiler (typically, this is the economizer section of the boiler). Alternately, the solar heat input can be made through a feedwater heater that is added in between two feedwater heaters that are heated with extraction steam. In this embodiment, the solar heat input into the feedwater stream can be varied by temperature and flow and, accordingly, the steam extraction heaters downstream of the solar feedwater heater will auto adjust to maintain the design feedwater temperature. This is achieved by the extraction steam flow auto adjusting based on the operating pressure and temperature of the feedwater heater.

Given the second law of thermodynamics, it is always beneficial to heat a working fluid at the highest possible temperature. Consequently it proposed that mainly the $1^{st}$ point heater be the primary source for supplemental solar heat; the $1^{st}$ point heater (last heater in the feedwater train) is operated at the highest pressure and is used to achieve heat addition to the feedwater at the highest temperature. The solar added feedwater heater can be placed either upstream or downstream of the $1^{st}$ point heater. If downstream, then the novelty has the ability to adjust the temperature of the feedwater that is directed to the boiler (economizer). If upstream, then the novelty can input variable solar heat resulting in the auto adjust of the extraction steam for all heaters downstream of the solar heater. For additional turbine capacity increase or to offset fossil fuel consumption, additional heaters could be used, however, this novelty proposes the solar direct heating of feedwater that is downstream of the boiler feed pump in order to maintain high efficiency.

It is noted that all of the feedwater heating in the proposed concept is provided by solar sensible heat. Accordingly, there is higher solar system efficiency since no heat of evaporation (latent heat) is solar provided; this allows heat transfer with smaller temperature differences than otherwise would be realized if the solar heat was used for evaporation also. The heat of evaporation for the Rankine cycle occurs in the fossil fueled boiler and, consequently, entropic losses associated with this flashing are already accounted for in the fossil fueled Rankine cycle. The use of solar provided sensible heat to an existing Rankine cycle is an advantage compared to a solar cycle which must provide its own latent heat for flashing.

DESCRIPTION OF THE PREFERRED EMBODIMENT

Figure 1:
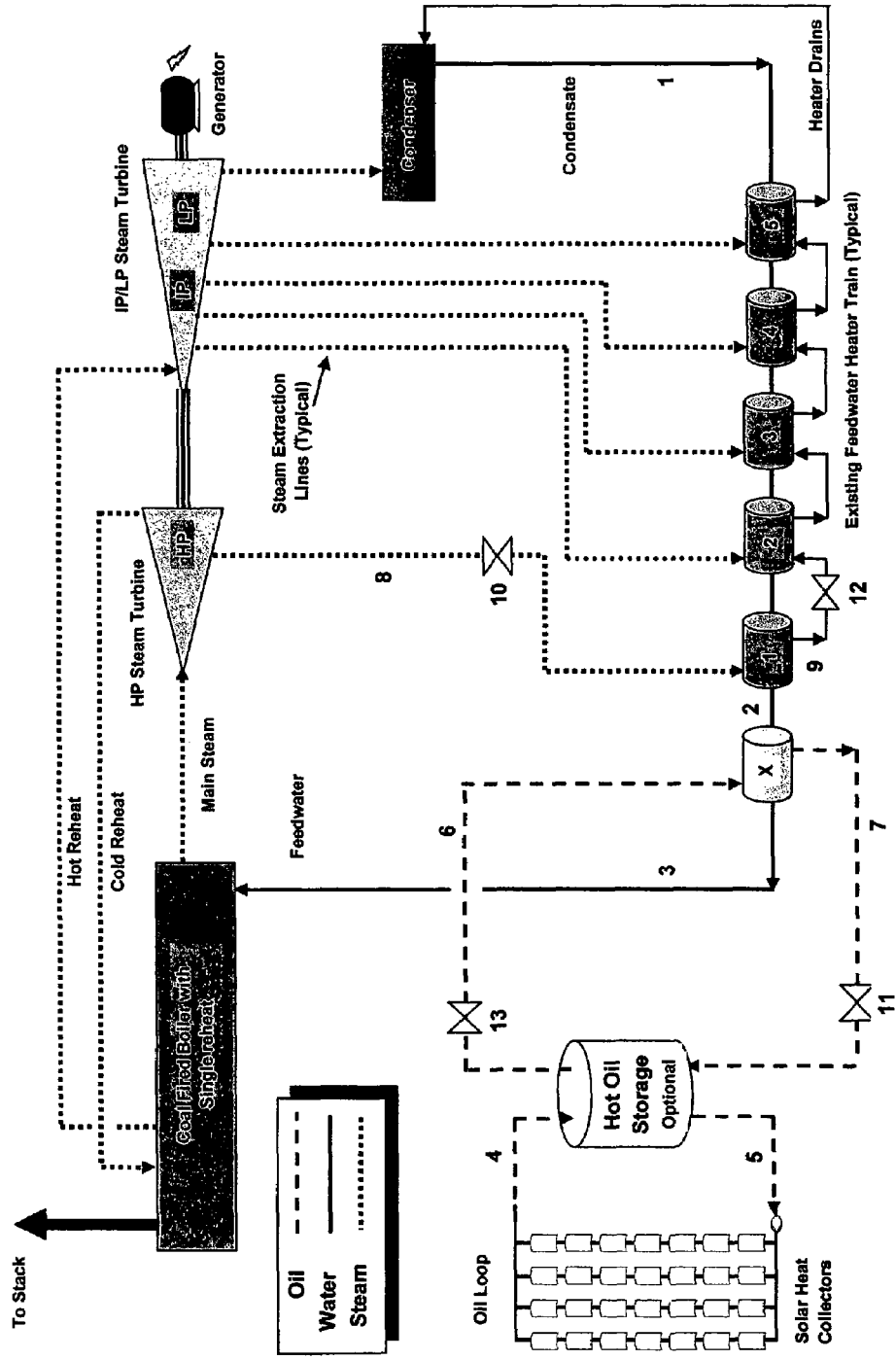
FIG. 1 shows the embodiment that has the solar added feedwater heater downstream of the last extraction steam feedwater heater (at the end of the regenerative feedwater train); in this embodiment, the feedwater temperature into the boiler can be varied.

Referring to FIG. 1, solar heat is collected with trough technology or other suitable solar concentrating heat collection devices. Using the solar trough technology (which can be substituted with other high temperature solar heating devices), the sun's energy is "line" focused on a Heat Collection Element (HCE). The HCE is essentially a specially designed pipe that contains a fluid suitable for the collection of high temperature heat. Once the sun's energy has been focused and concentrated on the HCE, the energy is collected in the high temperature collection fluid 4 that is typically special oil designed to withstand high temperatures. Current technology limits this temperature to about 730-750 F. The hot oil is then pumped into a Hot Oil Storage (optional) that would provide both storage for extended operation or storage that would allow for higher outputs of thermal energy for shorter durations. The Hot Oil Storage also provides a buffer to smooth out heat spikes and heat loss from the solar collectors. Once the heat has been delivered to the storage or to the feedwater train of the steam Rankine cycle, the oil 5 is then returned to the solar collector for reheating. The storage system can consist of a single tank using thermocline storage technology or also consist of two tanks; one specially designated for "hot" oil and the other specially designated for "cold" oil in order to ensure even flow delivery to the solar collector field. The hot oil storage may also be designed through additional length and oversized transfer piping to the solar feedwater heater. In this manner, the amount of heat transfer fluid in the pipeline provides the necessary storage.

The hot oil 6 fed from the Hot Oil Storage Tank is then directed to a new feedwater heater X that provides heat in addition to or in substitution for the heat provided by the steam extraction 8 to the upstream heater. Typically, the hot oil would be on the "shell side" of the feedwater heater X and the feedwater, because it would be at a much higher pressure, would be on the "tube side" of the feedwater heater. It is anticipated that most retrofit applications would consist of substituting heat provided by the hot oil 6 for the high pressure extraction steam 8. In this manner, design operating parameters of the economizer is maintained and additional generating capacity may be realized since more steam would then be available to expand through the Steam Turbine. The cooled oil 7 is then returned to storage and eventually cold oil 5 is returned to the solar loop for reheating.

As noted in FIG. 1, the proposed additional new oil feedwater heater X would be installed in series with the existing feedwater train is the novelty is applied to an existing plant (typical heater train shown in FIG. 1 are designated as heaters a, b, c, d, and e) which is used in typical Rankine cycles to preheat the condensate 1 and feedwater 2 (note: for simplicity, the boiler feed pump is not shown) prior to entry to the boiler economizer. When there is no heated oil 4 provided by the solar collector and when there is no storage hot oil 5, the feedwater would merely pass through the feedwater heater X having already been pre-heated with the conventional feedwater train with the only penalty being a small feedwater pressure drop through the added solar heater X. Valve 10 would then be valved open to allow steam extraction 8 from the turbine and another valve 12 would allow drips 9 to flow to the next lower pressure heater. When solar heat is available, the hot oil 4, 6 would then be pumped to the heater and the valving reversed to restrict the extraction steam flow to the existing heater and to restrict the drip flow 9 to the next lower pressure heater. Valving 11, 13 would allow safe operation of the solar hot oil supply system. Alternately, the new feedwater heater could be installed in parallel with the existing heater(s) with appropriate valving for when the heater is in use and when it is not. It should be noted that the additional new oil feedwater heater X could also be easily installed in parallel with the feedwater train to achieve the same effects (not shown).

Although the concept can be applied to existing coal Rankine systems, if applied to new systems, the boiler could then be designed to receive higher feedwater temperatures heated by supplemental solar heat. In this manner, efficiencies more closely resembling Carnot efficiencies would be achieved since the feedwater temperature would be closer to the feedwater's saturation temperature. In addition, higher turbine capability would also be achieved since extraction steam would be further reduced permitting higher turbine flows and resulting higher outputs.

Figure 2:
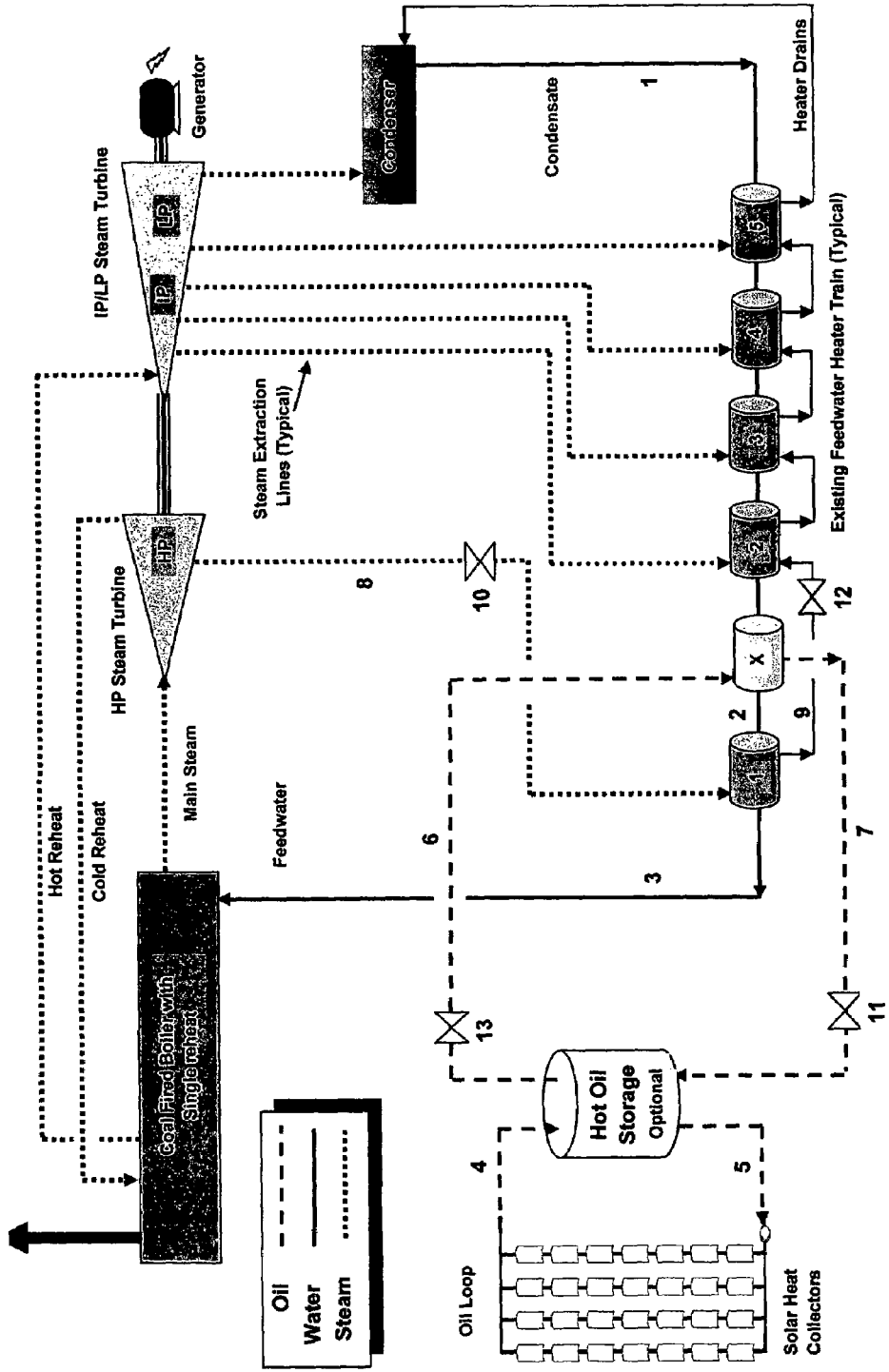
FIG. 2 shows the embodiment that has the solar added feedwater heater upstream of the last extraction steam feedwater heater; in this embodiment, the solar heat input, through control of the solar heat collection fluid flow and temperature, can be varied.

In FIG. 2 the same process is shown as is illustrated in FIG. 1 with the exception that the solar heat is supplied to a feedwater heater that is upstream of the $1^{st}$ point (high pressure) feedwater heater. In this manner, the solar heat into the feedwater stream can be varied by the control of the solar heating fluid's temperature and flow. The downstream feedwater heater, which is heated with extraction steam, from the solar feedwater heater X will automatically adjust the extraction steam flow based on the design temperature and pressure of the feedwater stream and the design temperature and pressure of the extraction steam flow.

This phenomenon results since the feedwater heater will condense that amount of pressurized steam based on the incoming temperature of the feedwater. As the temperature of the feedwater stream increases due to solar heating then the extraction steam will automatically diminish to compensate. In this manner, the total amount of solar heat that can be collected on days when the solar insolation may exceed the design can be utilized in an efficient manner. It is uneconomic to design the solar collection system to collect all possible solar insolation since it makes little economic sense to design the system when the full system may only operate, say, 3% or 4% of the time. However, this novelty allows all solar heat collected to be used and useful. No solar heat is ever lost due to the lack of capacity to process and use the solar heat. The auto adjust mechanism of the novelty compensates for any excess solar insolation that may be collected. In addition, this novelty also allows the Rankine cycle to automatically compensate for any modulation of the solar heat input.

What is claimed is:

1. A method of integrating solar heat into a regenerative Rankine cycle for generating electric power, the method comprising the steps of:
    boiling water into steam with a fossil fuel boiler;
    expanding the steam through at least one power generation turbine; condensing the expanded steam with at least one condenser to thereby generate condensed water;
    heating the condensed water with a first plurality of serially connected feedwater heaters;
    heating the condensed water with at least a first higher pressure feedwater heater connected in series with the first plurality of serially connected feedwater heaters and disposed downstream of a boiler feed pump;
    feeding steam turbine extraction steam from the turbine to the at least one higher pressure feedwater heater to thereby heat the condensed water through regeneration;
    generating a heated circulating fluid through the use of solar thermal sensible heat in a closed loop, single phase system in which all of the circulating fluid remains in the single phase of a liquid state as it circulates through the closed loop; and
    transferring energy from the solar heated fluid to the feedwater, at least one dedicated feedwater heater in series with other feedwater heaters and downstream of the boiler feed pump of a host regenerative Rankine cycle power plant, wherein the transferred solar heat is used to augment or replace steam turbine extraction steam used for heating feedwater in the one or more high pressure feedwater heaters downstream of the boiler feed pump of the host regenerative Rankine cycle power plant.

2. The method of claim 1, wherein the solar heated fluid's temperature is controlled to optimize the feedwater temperature during varying capacity loads of the host plant's Rankine cycle to maximize the overall efficiency of the Rankine cycle.

3. The method of claim 1, wherein the solar heated fluid's flow is controlled to optimize the feedwater temperature during varying capacity loads of the host plant's Rankine cycle to maximize the overall efficiency of the Rankine cycle.

4. The method of claim 1, wherein the solar fluid heating of the feedwater that replaces or augments the host plant's steam turbine extraction steam heating of the feedwater utilizes the idle capacity in the host Rankine power plant's steam turbine and generator that exists to handle increased steam flow through the steam turbine when one or more feedwaters are valved out of the steam cycle while maintaining essentially the same fuel input into the Rankine cycle.

5. The method of claim 1, wherein the solar fluid heating of the feedwater that replaces or augments the host plant's steam turbine extraction steam heating of the feedwater allows the boiler operator to reduce the fuel flow to the boiler realizing a lower fuel consumption at the same capacity output by replacing fossil fuel with solar heat.

6. The method of claim 1, wherein the placement of the transferred solar heat into the host plant's feedwater stream is such that the subsequent steam turbine extraction flows to the downstream feedwater heaters in the host plant's Rankine regenerative cycle are automatically regulated through the modulation of the solar heated fluid resulting in essentially the same feedwater temperature discharge temperature to the boiler with or without solar heat input into the previous feedwater heaters.

7. The method of claim 1, wherein the maximum amount of solar collected heat and full use of the concentrated solar collectors can be inputted into the host plant's feedwater through the use of automatic regulation of the host plant's extraction steam resulting from varying the solar heat input.

8. The method of claim 1, wherein the transferring of energy from the solar heated fluid to the feedwater of a host regenerative Rankine cycle power plant comprises the steps of: transferring the energy from the solar heated, closed loop system to a second closed loop system circulating a second fluid; transferring the energy from the second fluid in the second circulating closed loop system to the host plant's feedwater thereby eliminating any direct leakage of the solar heated fluid in the first circulating closed loop system into the host plant's feedwater stream.

9. The method of claim 1, additionally comprising using a lower pressure solar heated transfer fluid in a single closed loop system to preclude leakage into the higher pressure feedwater stream of the host plant's regenerative Rankine cycle.

10. The method of claim 1, wherein the use of solar heat storage is utilized.

11. The method of claim 1, wherein the transfer pipe carrying the solar heated fluid between the solar field and the regenerative Rankine cycle power plant is used as the primary storage mechanism.

12. The method of claim 1, additionally comprising inputting variable solar heat without the use of storage into the regenerative Rankine power plant cycle while maintaining constant heat input to the boiler and without altering the boiler fuel input.

13. A method of convening an existing fuel-fired Rankine cycle power generation system into a solar hybrid system by adding solar generated heat into the existing system, the method of comprising:
generating steam by combusting fuel in a fuel-fired boiler;
generating electrical power by expanding the steam through a turbine system connected to the fossil fuel fired boiler, the turbine system including at least one turbine;
discharging the expanded steam from a downstream end of the turbine;
condensing the expanded steam with at least one condenser so as to form condensed water;
heating the condensed water with partially expanded steam extracted from the turbine and directed into a first plurality of serially connected feedwater heaters connected to the condenser;
pumping the water from the first plurality of heaters to a high pressure with a boiler feed pump and into at least one high pressure feedwater heater;
heating the high-pressure water in the high-pressure feedwater heater with additional partially expanded steam from the turbine system;
adding at least one solar feedwater heater downstream from the boiler feed pump and in series with the at least one high pressure feedwater heater;
heating a liquid with a solar energy collector such that the liquid remains in a single liquid phase;
feeding the heated liquid into the at least one solar feedwater heater so as to transfer heat from the heated liquid into the feedwater in the at least one solar feedwater heater such that the liquid remains in the single liquid phase.

* * * * *

UNITED STATES PATENT AND TRADEMARK OFFICE
CERTIFICATE OF CORRECTION

| | | |
|---|---|---|
| PATENT NO. | : 7,640,746 B2 | Page 1 of 1 |
| APPLICATION NO. | : 11/440493 | |
| DATED | : January 5, 2010 | |
| INVENTOR(S) | : Mark Joseph Skowronski and Ronald Farris Kincaid | |

It is certified that error appears in the above-identified patent and that said Letters Patent is hereby corrected as shown below:

Title page (Item 73) Assignee, Line 1, change "Markon" to --Markron--.

Title page, item (*) Notice: should read as follows: nSubject to any disclaimer, the term of this patent is extended or adjusted under 35 U.S.C. 154(b) by 460 days.

Column 3, line 9, change "TH" to --THE--.

Column 7, line 14, in Claim 7, change "claim of 1," to --claim 1,--.

Column 7, line 36, in Claim 11, change "claim 1," to --claim 10,--.

Column 8, line 6, in Claim 13, change "convening" to --converting--.

Column 8, line 9, in Claim 13, after "method" delete "of".

Signed and Sealed this

Seventeenth Day of August, 2010

David J. Kappos
*Director of the United States Patent and Trademark Office*